United States Patent Office 3,377,190
Patented Apr. 9, 1968

3,377,190
GAS-PERMEABLE LAMINATED SHEET AND PROCESS FOR MAKING SAME
Maurice Edward Baguley, Coventry, England, assignor to Courtaulds Limited, London, England, a British company
No Drawing. Filed July 16, 1964, Ser. No. 383,246
Claims priority, application Great Britain, July 18, 1963, 28,402/63; Jan. 14, 1964, 1,535/64
3 Claims. (Cl. 117—63)

ABSTRACT OF THE DISCLOSURE

A gas-permeable laminated sheet including a coherent fibrous layer and an adherent microporous polymer layer, the polymer being a linear block copolymer containing segments of a random copolyamide and of polyethylene oxide, polytetramethylene oxide or polybutadiene, the microporous layer containing particles of an elastomer immiscible in the solid state with the copolymer; and a process for making a gas-permeable, microporous laminated sheet comprising dissolving a block copolymer, as above described, in the continuous phase of an elastomeric emulsion, forming a layer of the emulsion on the fibrous layer, precipitating the block copolymer to form a gel containing residual solvent and entrained particles of the elastomer, and reducing the solvent content of the gel at a temperature below the glass-transition temperature of the gel.

This invention is concerned with a pliable laminated sheet having a microporous structure permeable to gases. The sheet may be used as a substitute for leather in many of its applications and offers the advantage that its critical properties may be controlled within narrow limits whilst those of the natural product are notoriously variable.

According to the present invention a laminated sheet comprises a coherent fibrous layer and an adherent microporous layer of a polyamide-containing polymer.

The term "polymer" embraces homogeneous polymers, random, graft and block copolymers and mixtures of any two or more of these.

The microporous polymer is preferably formed by precipitating the polymer from a solution to form a gel containing residual solvent and thereafter eliminating the solvent at a temperature below the glass transition temperature of the gel with the result that the polymer molecules tend to aggregate in interconnected micelles developing pores in regions vacated by the polymer migrating into the micelles. It is important that the solvent should be removed at a temperature less than the glass transition temperature of the gel, to inhibit the free movement of the polymer molecules which would reduce the opportunity of the polymer aggregating in the form of interconnected micelles and lead to a general contraction in size of the gel and eventually to a substantially homogeneous layer of polymer having an insignificant porous structure. The composition of the gel of course, becomes richer in polymer throughout the process of removing the solvent, and the glass transition temperature of the gel is therefore increased by the process. Advantage may be taken of this phenomenon by gradually increasing the temperature at which the solvent is removed. This is particularly important when the solvent is volatilised from the gel. Thereafter, the solvent is washed from the gel by a coagulant liquid which is miscible with the solvent and a non-solvent for the polymer.

The step of precipitating the polymer as a gel from a polymer solution involves reducing the power of the solvent, for example by diluting the solution with a non-solvent for the polymer which is also miscible with the solvent. Alternatively a liquid which is a solvent for the polymer at an elevated temperature, but a non-solvent when cooler, may be employed to form a polymer solution from which the gel is precipitated on cooling. For example, hot aqueous methanol or aqueous ethanol containing a major proportion of the alcohol can dissolve certain random polyamide copolymers, for example those of caprolactam and hexamethylene adipamide salt in which each monomeric species contributes at least 20 percent by weight to the polymer. The solutions are stable when hot, but precipitate a gel at temperatures nearer ambient temperatures, say below 30° C. The gels formed from aqueous alcoholic solutions may be leeched of solvent by treatment with water. If the process extends over several stages in progressing through the stages the solvent content of the gel is successively reduced, and the temperature of the leeching water in each stage may be higher than that employed in the preceding stage.

The polymer may with advantage be a block copolymer of which one segment species is a polyamide and the other a polymer having a melting point of less than 80° C., the latter species contributing from 5 to 50 percent of the weight of the copolymer. This polymer has a greater elastic recovery than polymers having no low melting point segment and can better withstand repeated flexing. Suitable low melting point segments include polyethers such as polyethylene oxide and polytetramethylene oxide and certain hydrocarbons such as polybutadiene. The block copolymers may be made by first synthesising the polymeric precursor of the segment with functional end groups, which are or can be made reactive to carboxylic acid or amine groups, and subsequently reacting the precursor with a polyamide. For example, polybutadiene may be synthesised with carboxylic acid end groups and reacted with a polyamide having terminal amino groups. Alternatively, a polyether may be made having hydroxyl end groups, which are reacted with a diisocyanate to form a polymer having terminal isocyanate groups which is reacted with the polyamide.

According to another aspect of the invention the microporous polymer layer is composed of a mixture of the polyamide-containing polymer and an elastomer which is immiscible with the polymer in the solid state. The resistance to cracking by flexing is even more pronounced in a sheet incorporating this kind of polymer layer.

The elastomer is preferably one which may be formed into an emulsion or latex stable to the solvent employed in dissolving the polymer so that the gel may be formed by coagulating a solution of the polymer in an emulsion of the elastomer. I have found that it is unnecessary that the emulsion should be coagulated when the gel is formed. Apparently, even under these circumstances, sufficient elastomer is trapped within the gel to have a beneficial effect on the flex resistance of the sheet.

I prefer to synthesise the elastomer emulsion in the solution of the polyamide-containing polymer with the result that a portion of the elastomer is grafted on the polyamide-containing polymer. The graft copolymer has an inherently greater elastic recovery. Thus we have formed a hot solution of a copolymeric nylon in aqueous methnol, added ethyl acrylate, a surface active agent and a free-radical initiator and formed a solution of copolyamide having grafted polyethylacrylate in an emulsion of polyethylacrylate. The gel was precipitated by cooling or diluting the solution with water.

The gel may be precipitated on a surface and transferred to the fibrous layer or the fibrous layer may be impregnated with the solution which is gelled in situ. The sheet of this invention may, therefore, comprise a veneer of polymer on a fibrous layer with only sufficient interpenetration to lock the layers together, or the interpenetration may be greater up to and including complete impregnation of the fibrous layer with the polymer.

Although the polymer and the fibrous layer should be locked against easy separation, nevertheless a limited amount of relative movement considerably reduces the stiffness of the sheet and in order to obtain the most supple sheets we prefer to lubricate the fibres, thereby inhibiting any substantial mechanical bond between polymer and fibres and easing the longitudinal movement of the fibre relatively to the polymer. Any of the well-known lubricating agents may be used, but I prefer silicones.

The sheet should have a water permeability of more than $0.15 \times 10^{-6}$ gm./cm.$^2$/sec. and preferably not more than $3.0 \times 10^{-6}$ gm./cm.$^2$/sec. at 95° F. and 65 percent relative humidity. The permeability to gases varies with their chemical and physical natures. For example, the sheet may pass substantially more water vapour than air because of the greater affinity of the polymer for water, particularly when the polymer contains a hydrophilic segment such as polyethylene oxide.

The invention is illustrated by the following examples in which parts are by weight.

Example 1

10 parts of a nylon copolymer prepared from a mixture of 40 percent hexamethylene adipamide salt and 60 percent caprolactam and having a molecular weight of approximately 50,000, and 10 parts of a nylon copolymer prepared from equal weights of the same monomers and having a similar molecular weight were dissolved in 18 parts of aqueous methanol (60 percent by weight of methanol).

The solution was applied to one surface of a porous, bonded, non-woven felt of crimped nylon fibres and spread by a knife to form a surface coating. The felt was then immersed in water at 20° C. until the nylon polymer mixture had gelled to an adherent, uniformly microporous coating on the felt.

The coating was softened and made more flexible by soaking the sheet in an ammoniacal solution of salicylamide (10 percent) for 15 minutes, the surplus solution was removed by mangling and then drying the material in a warm air oven.

Example 2

The nylon copolymer solution prepared as in Example 1 had added to it, 1.5 parts of a dispersing agent and 8 parts of benzyl salicylate. The mixture was agitated to emulsify the benzyl salicylate.

A dense felt of crimped nylon fibres was surface coated with the nylon copolymer solution which was allowed to gel by air drying at ambient temperature. Thereafter the sheet was completely dried in a warm air oven and had developed by this time a permeability to water vapour of $0.24 \times 10^{-6}$ gm./cm.$^2$/sec. at 95° F. and 65 percent relative humidity.

Example 3

2.5 parts of each of the nylon copolymers described in the preceding examples were dissolved in 48 parts of methanol to which 50 parts of a polyacrylate elastomer latex was added.

A bonded non-woven crimped nylon fibre felt was impregnated with a silicone finish which was cured by heat before the felt was completely impregnated with the polymer solution. A coating layer of the solution was subsequently added to one side of the felt to form a surface layer. The felt was immersed in a bath of 1 N hydrochloric acid for 13 minutes to gel the solution and then in 10 percent aqueous ammonia for 1 hour to harden the tacky polymer. Finally the sheet was washed with water and dried in a warm air oven.

Example 4

A mixture of ethyl acrylate (144 parts) and methyl methacrylate (16 parts) was polymerised in a solution containing 20 parts of a nylon copolymer containing 40 percent hexamethylene adipamide and the balance caprolactam, 20 parts of a nylon copolymer containing equal weights of hexamethylene adipamide and caprolactam, 10 parts of sodium stearate, 0.3 part of azo-bis-isobutyronitrile, in 200 parts of 60 percent aqueous methanol at 60° C.

A piece of the crimped nylon fibre felt previously treated with a silicone release agent, was completely impregnated with the nylon copolymer solution containing emulsified polyethyl acrylate. The solution was gelled and the sheet treated as described in the immediately preceding example.

Example 5

A mixture of ethyl acrylate (126 parts) methyl methacrylate (7 parts) and glycidyl methacrylate (7 parts) was polymerised in a solution containing 60 parts of a nylon copolymer made up of equal weights of hexamethylene adipamide and caprolactam, 14 parts of sodium stearate and 0.35 part of azo-bis-isobutyronitrile and 200 parts of 60 percent aqueous methanol at 60° C. The nylon solution then contained an emulsion of the acrylate/methacrylate copolymer.

The solution, maintained at 40° C., was applied to a dense felt of crimped nylon fibres and gelled by soaking in water for 1 hour at 20° C. The sheet was fully dried in a warm air oven and had by this time developed a permeability to water vapour of $0.21 \times 10^{-6}$ gm./cm.$^2$/sec. at 95° F. and 65 percent relative humidity.

Example 6

4.8 parts of a nylon copolymer prepared from a mixture of 60 percent caprolactam and 40 percent hexamethylene adipamide salt containing excess hexamethylene diamine and having a molecular weight of 4,500 and terminal amino groups were dissolved in 20 parts of 90 percent aqueous methanol.

Polytetrahydrofuran (1.96 parts) of molecular weight 1,000 and having hydroxyl end groups was reacted with sufficient tolylene-2,4-diisocyanate to produce a coupled polymer of molecular weight 2,000 having terminal isocyanate groups. The coupled polymer was added to the nylon copolymer solution and stirred for 2 hours at ambient temperature. The resultant product was a block copolymer having alternating segments of polyamide and polyether.

The solution was diluted with 20 parts of 90 percent aqueous methanol and then used to impregnate a piece of dense, crimped nylon fibre felt which had been previously treated with a silicone release agent. The impregnated felt was gelled in water for 1 hour and the sheet dried in a warm air oven.

Example 7

15 parts of the block copolymer made as described in Example 6 were dissolved in 85 parts of methanol and 40 parts of a latex containing 15 parts of polyethyl acrylate was blended with the solution.

The solution containing the latex was used to impregnate a felt of crimped nylon fibres which had been finished with a silicone release agent and the contained solution was gelled by soaking in water for 1 hour followed by drying in a warm air oven so that the finished sheet had a permeability to water vapour of $0.3 \times 10^{-6}$ gm./cm.$^2$/sec. at 95° F. and 65 percent relative humidity and survived 3,000,000 cycles of flexing in a flex-testing machine.

Example 8

15 parts of the block copolymer prepared as in Example 6 were dissolved in 85 parts of methanol and 40 parts of a random copolymer latex containing ethyl acrylate and methyl methacrylate was dispersed in the solution. The solution was used to impregnate a coherent felt of crimped nylon fibres which was transferred to a water bath to gel the block copolymer constituent. The polymer acrylate solution was not coagulated and most of the polyacrylate polymer was removed from the felt by repeated washing with water leaving the gel contained by the felt in a micro-cellular form. The product was later dried in a warm air oven and was then found to have a water vapour permeability of $0.28 \times 10^{-6}$ gm./cm.$^2$/sec. at 95° F. and 65 percent relative humidity and a flex resistance of more than 2,000,000 cycles in the flex-testing machine.

What I claim is:

1. A gas-permeable laminated sheet comprising (1) a coherent fibrous layer and (2) an adherent microporous polymer layer; said polymer layer comprising a linear block copolymer soluble in aqueous alcohol, and consisting essentially of segments of a random copolyamide and those of a polymer chosen from the group consisting of polyethylene oxide, polytetramethylene oxide and polybutadiene; wherein the microporous layer contains particles of an elastomer immiscible with the block copolymer in the solid state.

2. The gas-permeable laminated sheet of claim 1, wherein said elastomer is an acrylate elastomer.

3. A process for making a gas-permeable laminated sheet comprising:

dissolving a block copolymer soluble in aqueous alcohol and consisting essentially of segments of a random copolyamide and those of a polymer chosen from the group consisting of polyethylene oxide, polytetramethylene oxide and polybutadiene, in the continuous phase of an emulsion of an elastomer;

forming a layer of the emulsion containing the dissolved copolymer on a surface of a coherent fibrous layer;

precipitating the block copolymer to form a gel containing residual solvent and entraining particles of the elastomer; and reducing the solvent content of the gel at a temperature below the glass-transition temperature of the gel, whereby the copolymer aggregates in interconnected micelles, generating pores in the gel layer.

References Cited
UNITED STATES PATENTS

| | | | |
|---|---|---|---|
| 2,544,637 | 3/1951 | Caldwell | 117—161 |
| 3,038,885 | 6/1962 | Best | 260—857 X |
| 3,189,664 | 6/1965 | Nozaki | 260—857 X |
| 3,190,766 | 6/1965 | Yuan | 117—63 |

WILLIAM D. MARTIN, *Primary Examiner.*

T. G. DAVIS, *Assistant Examiner.*